United States Patent
Wu (10) Patent No.: US 11,553,388 B2
(45) Date of Patent: Jan. 10, 2023

(54) DEVICE AND METHOD OF HANDLING MOBILITY BETWEEN LONG-TERM EVOLUTION NETWORK AND FIFTH GENERATION NETWORK

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/007,987

(22) Filed: Jun. 13, 2018

(65) Prior Publication Data

US 2018/0368039 A1 Dec. 20, 2018

Related U.S. Application Data

(60) Provisional application No. 62/520,585, filed on Jun. 16, 2017.

(51) Int. Cl.
*H04W 36/14* (2009.01)
*H04W 48/18* (2009.01)
*H04W 8/20* (2009.01)
*H04W 36/00* (2009.01)
*H04W 88/06* (2009.01)
*H04W 76/22* (2018.01)

(52) U.S. Cl.
CPC .............. *H04W 36/14* (2013.01); *H04W 8/20* (2013.01); *H04W 36/0033* (2013.01); *H04W 36/0072* (2013.01); *H04W 48/18* (2013.01); *H04W 76/22* (2018.02); *H04W 88/06* (2013.01)

(58) Field of Classification Search
CPC ............. H04W 36/14; H04W 36/0033; H04W 36/0072; H04W 48/18; H04W 8/20; H04W 76/22; H04W 88/06; H04W 76/11; H04W 76/27; H04W 76/10
USPC ........................................................ 370/331
See application file for complete search history.

(56) References Cited

U.S. PATENT DOCUMENTS

| | | | |
|---|---|---|---|
| 2013/0315321 A1 | 11/2013 | Rajagopal | |
| 2016/0353465 A1 | 12/2016 | Vrzic | |
| 2017/0339609 A1* | 11/2017 | Youn | ..................... H04W 76/11 |

(Continued)

FOREIGN PATENT DOCUMENTS

| | | |
|---|---|---|
| CN | 105898894 A | 8/2016 |
| CN | 106572516 A | 4/2017 |

(Continued)

OTHER PUBLICATIONS

3GPP TS 23.502 V0.4.0, May 2017.

(Continued)

*Primary Examiner* — Mohammed S Chowdhury
(74) *Attorney, Agent, or Firm* — Winston Hsu (57) ABSTRACT

A communication device for handling mobility from a long-term evolution (LTE) network to a fifth generation (5G) network comprises a storage device storing instructions of transmitting a first LTE Non-Access Stratum (NAS) message to the LTE network; receiving a second LTE NAS message in response to the first LTE NAS message, from the LTE network; and transmitting a message to the 5G network, after determining to communicate with the 5G network instead of the LTE network, wherein the message comprises a slice information, and the slice information is comprised in the first LTE NAS message or in the second LTE NAS message.

10 Claims, 7 Drawing Sheets

(56) References Cited

U.S. PATENT DOCUMENTS

| | | | |
|---|---|---|---|
| 2018/0035399 A1 | 2/2018 | Xu | |
| 2018/0227872 A1* | 8/2018 | Li | H04W 60/04 |
| 2018/0376446 A1* | 12/2018 | Youn | H04W 8/20 |
| 2019/0021043 A1* | 1/2019 | Youn | H04W 36/0055 |
| 2019/0104455 A1* | 4/2019 | Park | H04W 36/0022 |
| 2019/0159027 A1* | 5/2019 | Kuge | H04W 12/06 |
| 2019/0159117 A1* | 5/2019 | Kuge | H04W 8/08 |
| 2019/0191348 A1* | 6/2019 | Futaki | H04W 36/0033 |
| 2019/0261233 A1* | 8/2019 | Duan | H04W 36/14 |
| 2019/0364495 A1* | 11/2019 | Mildh | H04W 60/00 |
| 2020/0029205 A1* | 1/2020 | Hu | H04W 12/06 |
| 2021/0014688 A1* | 1/2021 | Ito | H04W 48/18 |

FOREIGN PATENT DOCUMENTS

| | | |
|---|---|---|
| CN | 106713406 A | 5/2017 |
| EP | 3364695 A1 | 8/2018 |
| WO | 2017/086646 A1 | 5/2017 |
| WO | 2018/069852 A1 | 4/2018 |

OTHER PUBLICATIONS

Search Report dated Dec. 12, 2018 for EP application No. 18178096. 6, pp. 1-9.
Ericsson, "Solution for selection of a network slice instance", SA WG2 Meeting #116, S2-164258, Jul. 11-15, 2016, Vienna, AT, XP051121881, pp. 1-5.
Search Report dated Sep. 17, 2018 for EP application No. 18178096. 6, pp. 1-19.
Office action dated Mar. 16, 2020 for the China application No. 201810621820.0, filing date Jun. 15, 2018, p. 1-6.
Search Report dated Nov. 20, 2019 for EP application No. 19186352. 1, pp. 1-22.
3GPP TR 23.799 V14.0.0 (Dec. 2016),"3rd Generation Partnership Project; Technical Specification Group Services and System Aspects; Study on Architecture for Next Generation System (Release 14)", XP051295448, pp. 1-522.
Nokia, "Possible RAN use cases for slicing and other RAN impacts for RAN coordination", SA WG2 Meeting #117, S2-165879, Oct. 17-21, 2016, Kaohsiung, Taiwan, XP051155459, pp. 1-4.
3GPP TR 23.799 V14.0.0 (Dec. 2016), "3rd Generation Partnership Project; Technical Specification Group Services and System Aspects; Study on Architecture for Next Generation System (Release 14)", XP051295448, pp. 51-58, Dec. 2016.
LG Electronics Inc., "Handling of NSSAI related information in initial access", 3GPP TSG-RAN2 Meeting #98, R2-1705674, May 15-19, 2017, Hangzhou, China, XP051275988, pp. 1-2.
Summons to attend oral proceedings mailed/issued on Apr. 12, 2021 for EP application No. 18178096.6, pp. 1-11.
Nokia, Alcatel-Lucent Shanghai Bell, "Solutions for for Network Slice Selection", 3GPP TSG-RAN WG3 Meeting #92, R3-161356, May 23-27, 2016, Nanjing, China, XP051106154, pp. 1-6.
Office action dated Jun. 11, 2021 for EP application No. 19186352. 1, pp. 1-8.
Pérez, André, "General Characteristics", LTE and LTE Advanced: 4G Network Radio Interface, XP055863650, pp. 1-37, John Wiley & Sons, Incorporated, 2015. ProQuest Ebook Central, http://ebookcentral.proquest.com/lib/epo-ebooks/detail.action?docID=4323298, 2015.

* cited by examiner

DEVICE AND METHOD OF HANDLING MOBILITY BETWEEN LONG-TERM EVOLUTION NETWORK AND FIFTH GENERATION NETWORK

CROSS REFERENCE TO RELATED APPLICATIONS

This application claims the benefit of U.S. Provisional Application No. 62/520,585, filed on Jun. 16, 2017, which is incorporated herein by reference.

BACKGROUND OF THE INVENTION

1. Field of the Invention

The present invention relates to a device and a method used in a wireless communication system, and more particularly, to a device and a method of handling mobility between a Long-term Evolution network and a fifth generation network.

2. Description of the Prior Art

A fifth generation (5G) system is recently developed in 3rd Generation Partnership Project (3GPP). Thus, inter-system mobility between a long-term evolution (LTE) system and the 5G system is an issue to be solved, to provide seamless service continuity for a user equipment moving between the two systems.

SUMMARY OF THE INVENTION

The present invention therefore provides a communication device and method for handling mobility between a Long-term Evolution (LTE) network and a fifth generation (5G) network to solve the abovementioned problem.

A communication device for handling mobility from a LTE network to a 5G network comprises a storage device for storing instructions and a processing circuit coupled to the storage device. The storage device stores, and the processing circuit is configured to execute instructions of transmitting a first LTE Non-Access Stratum (NAS) message to the LTE network; receiving a second LTE NAS message in response to the first LTE NAS message, from the LTE network; and transmitting a message to the 5G network, after determining to communicate with the 5G network instead of the LTE network, wherein the message comprises a slice information, and the slice information is comprised in the first LTE NAS message or in the second LTE NAS message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
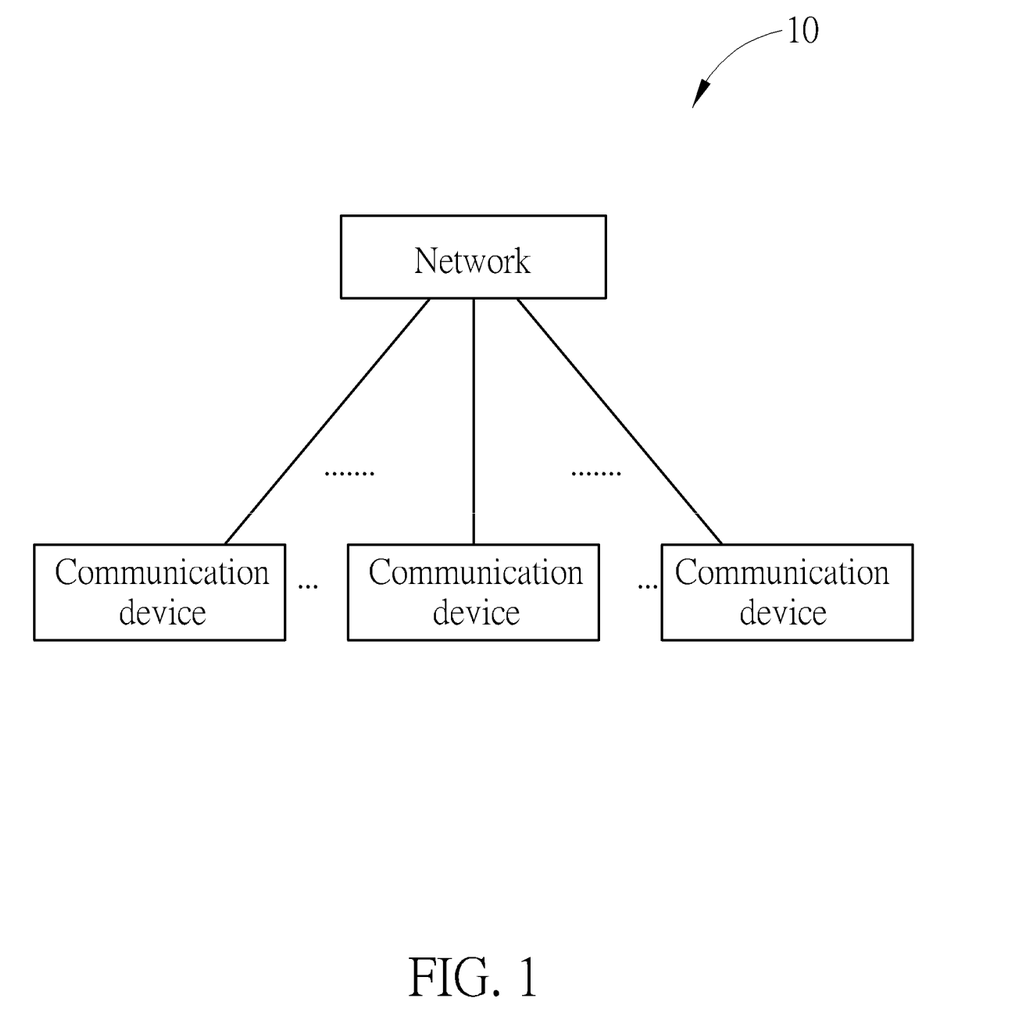
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device may communicate with each other via one or multiple cells (e.g., multiple carriers) belonging to one or multiple base stations (BSs).

In FIG. 1, the network may include a radio access network (RAN) and a core network (CN). The RAN may include at least one base station (BS). The RAN may be an evolved Universal Terrestrial Radio Access Network (E-UTRAN), a new radio (NR) RAN (or called a fifth generation (5G) RAN), an evolved NR RAN or a sixth generation (6G) RAN. The CN may be an Evolved Packet Core (EPC) network, a 5G CN or a 6G CN.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
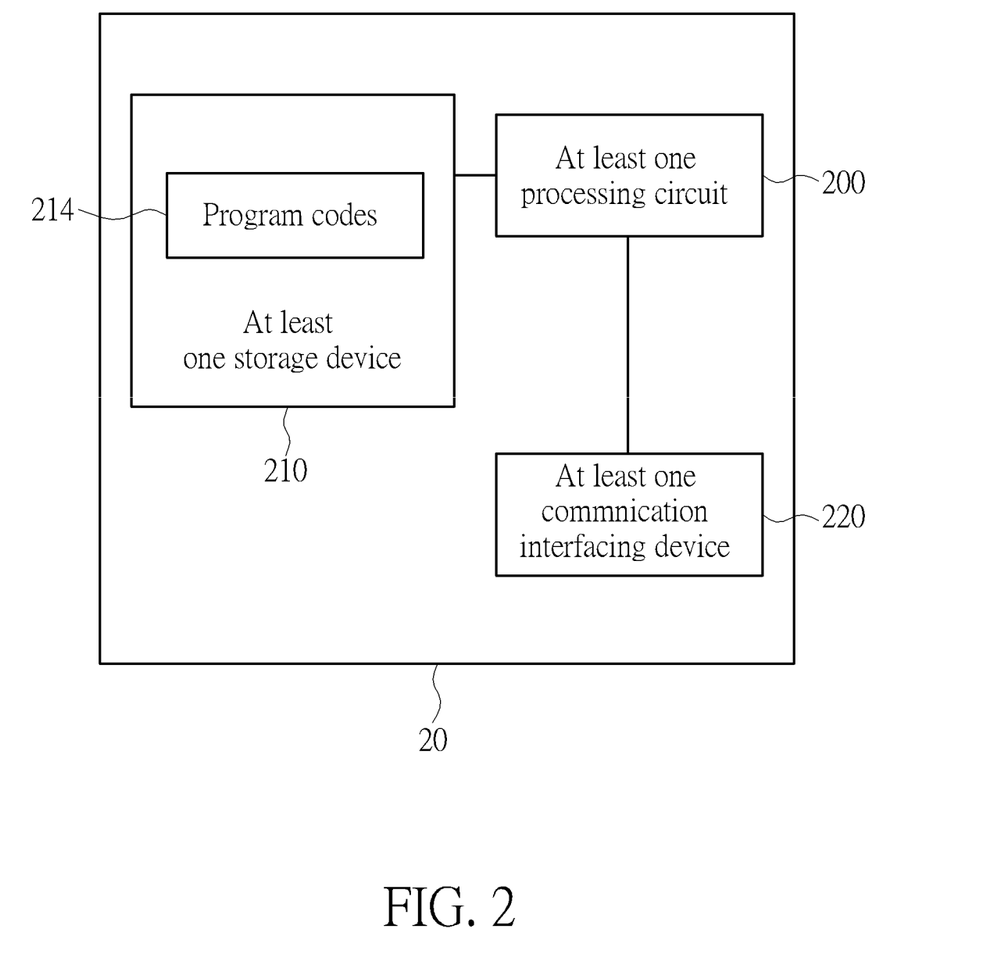
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

A Single Network Slice Selection Assistance information (S-NSSAI) identifies a Network Slice. The S-NSSAI comprises a Slice/Service type (SST) and a Slice Differentiator (SD). The SST refers to the expected Network Slice behavior in terms of features and services. The SD is optional information that complements the SST(s) to allow differentiation for selecting a Network Slice instance from potential Network Slice instances that comply with the indicated SST.

A NSSAI is a collection of S-NSSAIs. There are at most 8 S-NSSAIs in the NSSAI transmitted in a signaling message between the UE and the network. Each S-NSSAI assists the network in selecting a particular Network Slice instance.

Figure 3:
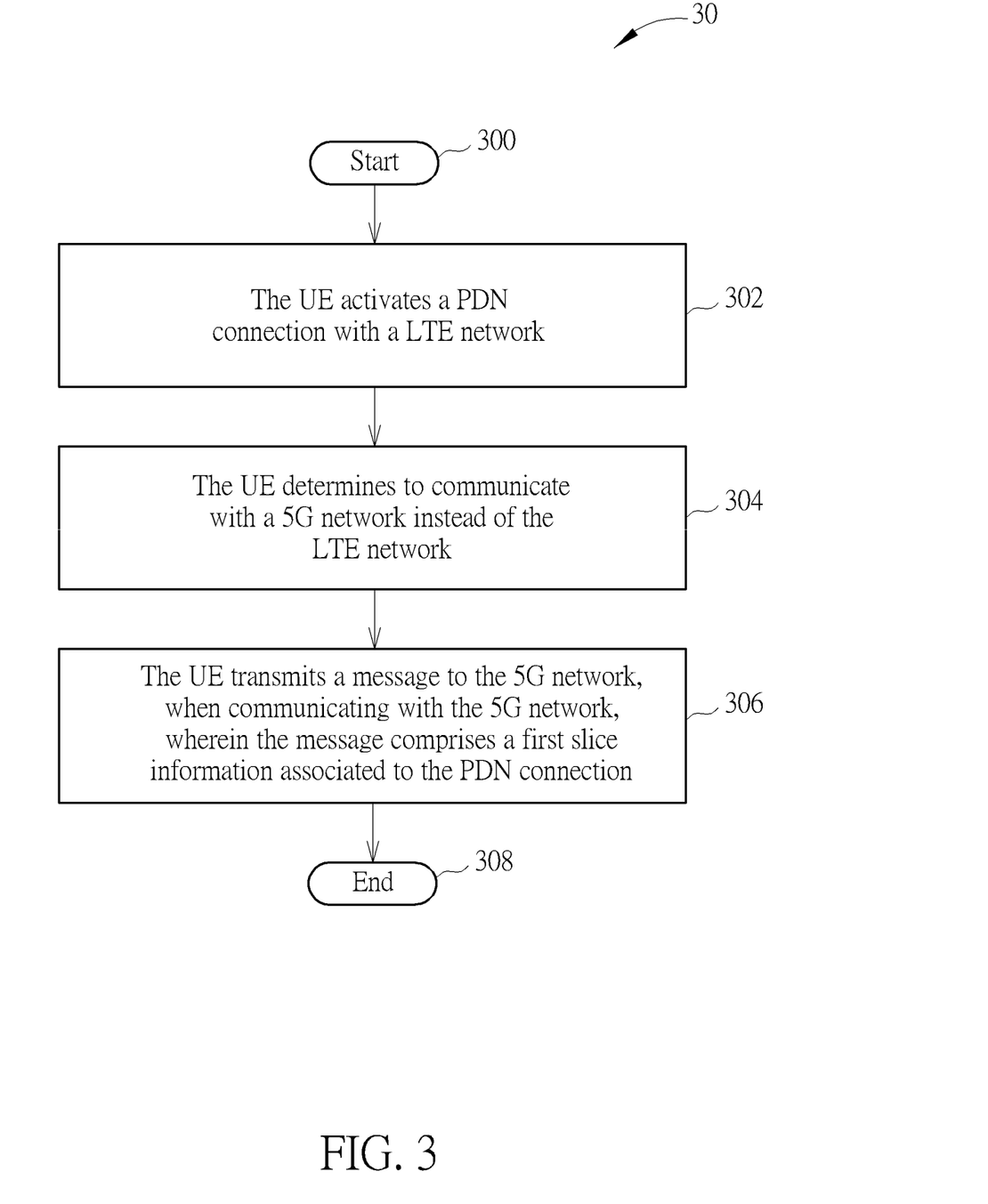
FIG. 3 is a flowchart of a process according to an example of the present invention.

A process 30 in FIG. 3 is utilized in a UE, and includes the following steps:

Step 300: Start.

Step 302: The UE activates a Packet Data Network (PDN) connection with a LTE network.

Step 304: The UE determines to communicate with a 5G network instead of the LTE network.

Step 306: The UE transmits a message to the 5G network, when communicating with the 5G network, wherein the message comprises a first slice information associated to the PDN connection.

Step 308: End.

In one example, the UE activates the PDN connection by transmitting a PDN Connectivity Request message to an EPC network of the LTE network (e.g., a Mobility Management Entity (MME)). The UE receives an Activate Default Evolved Packet System (EPS) Bearer Context Request message from the LTE network in response to the PDN Connectivity Request message. The UE may transmit an Activate Default EPS Bearer Context Accept message to the LTE network in response to the Activate Default EPS Bearer Context Request message.

The UE performs step 304 after performing step 302. In one example, the UE determines to communicate or communicates with the 5G network instead of the LTE network in response to a cell selection or reselection performed by the UE. In one example, the UE determines to communicate or communicates with the 5G network instead of the LTE network in response to a command message received from the LTE network. For example, the command message is a handover command message (e.g., RRCConnectionReconfiguration) or a redirection command (e.g., a RRC connection release message).

In one example, the Activate Default EPS Bearer Context Request message includes the first slice information. Thus, the UE uses the first slice information in the message. The network may be configured to associate the first slice information to the PDN connection or to use the first slice information for the PDN connection.

In one example, the UE determines (e.g., selects or sets) the first slice information according to the PDN connection (or configuration(s) of the PDN connection). For example, the UE determines the first slice information according to an EPS bearer context associated to the PDN connection. The EPS bearer context may be a default EPS bearer context or a dedicated EPS bearer context. The UE may be configured by the default EPS bearer context, when receiving the Activate Default EPS Bearer Context Request message. The UE may be configured by the dedicated EPS bearer context, when receiving an Activate Dedicated EPS Bearer Context Request message from the LTE network. The EPS bearer context may include an EPS bearer identity, Quality of Service (QoS) parameter(s), an access point name (APN), a QoS Class Identifier (QCI), a PDN address, a PDN type, an APN aggregate maximum bitrate and/or protocol configuration option(s). For example, the UE determines the first slice information according to at least one parameter (or characteristic) associated to the PDN connection. The at least one parameter may include at least one of the items in the EPS bearer context described above.

In one example, the first slice information identifies at least one network slice. In one example, the first slice information is associated to a first network slice. In one example, the first slice information includes a first SST. In one example, the first slice information includes a first NSSAI or a first S-NSSAI. In one example, the first slice information includes a first slice identifier.

In one example, the message is a Registration Request message. The UE initiates a registration procedure with a 5G core network (5GCN) (e.g., Core Access and Mobility Management Function (AMF)) of the 5G network, when determining to communicate with the 5G network instead of the LTE network (e.g., in response to the determination). The UE transmits the Registration Request message to the 5G network in the registration procedure. The UE receives a Registration Accept message from the 5GCN in response to the Registration Request message. The Registration Accept message may or may not include the first slice information. The Registration Request message may further include or indicate at least one of a Registration type, a Subscriber Permanent Identifier (SUPI) or a 5GCN temporary identifier (e.g., 5G Globally Unique Temporary Identifier (5G-GUTI) or 5G S-Temporary Mobile Subscriber Identity (S-TMSI)), Security parameters, a UE 5GCN Capability, a PDU session status, a first PDU session ID and a first PDU session. The first PDU session ID identifies the first PDU session. In one example, the first PDU session ID is derived or determined by the UE according to the PDN connection. The PDU session status indicates previously established PDN connection(s) by the UE in the LTE network. In one example, the first PDU session (e.g., a context of the first PDU session) is associated to, transformed from, mapped from or converted from configuration(s) of the PDN connection or an EPS bearer context of the PDN connection. The UE may indicate the first PDU session is activated (e.g., active) in the PDU session status according to the PDN connection, when the PDN connection is activated (e.g., active) in the LTE network. That is, the UE determines that the first PDU session has been activated or intends the first PDU session to be re-activated in the 5G network, according to a status of the PDN connection (e.g., activated). The 5G network may or may not include the PDU session status indicating that the first PDU session is activated, in the Registration Accept message. Thus, the UE does not perform a PDU Session Establishment procedure to establish the first PDU session, because the UE already establishes it.

In one example, the 5G network indicates that the PDU session status is inactive (e.g., deactivated) in the Registration Accept message, if the 5G network does not have a context of the first PDU session. In one example, the 5G network does not receive a configuration of the PDN connection and an EPS bearer context associated to the PDN connection from the LTE network. In one example, the 5G network determines that the first PDU session is invalid. Thus, the 5G network indicates that the PDU session status is inactive. The UE may perform the PDU Session Establishment procedure with the 5G network to establish the first PDU session (or a new PDU session) for data service(s) (e.g., internet, web browsing, Facebook, whatsApp, etc.) which are performed by the UE according to the PDN connection or the EPS bearer context associated to the PDN connection in the LTE network.

In one example, the UE includes second slice information (e.g., associated to a second network slice) in the Registration Request message to request the 5G network. Thus, the Registration Accept message may include the second slice information. In one example, the second slice information includes a second SST. In one example, the second slice information includes a second NSSAI or a second S-NSSAI. In one example, the second slice information includes a second slice identifier. In one example, the first S-NSSAI and the second S-NSSAI have the same SD or different SDs. In one example, the UE may or may not transmit the second slice information to the LTE network. The UE may or may not receive the second slice information from the LTE network.

In one example, the message is a Service Request message. The UE initiates a Service Request procedure with the 5GCN (e.g., AMF) of the 5G network, e.g., for data transmission, when determining to communicate with the 5G network instead of the LTE network (e.g., in response to the determination). The UE transmits the Service Request message to the 5G network in the Service Request procedure. The UE receives a Service Accept message or an RRCConnectionReconfiguration message, from the 5G core network in response to the Service Request message. The Service Accept message may or may not include the first slice information. The Service Request message may include or indicate at least one of a SUPI, a 5G-GUTI, Security parameters, a UE 5GCN Capability, a PDU session status, a first PDU session ID and a first PDU session. The first PDU session ID identifies the first PDU session. In one example, the first PDU session ID is derived or determined by the UE according to the PDN connection. In one example, the first PDU session is associated to, transformed from, mapped from or converted from the PDN connection by the UE. The UE may indicate that the first PDU session is activated (e.g., active) in the PDU session status according to the PDN connection, when the PDN connection is activated (e.g., active) in the LTE network.

In one example, the message is a RRC message of a RRC connection establishment procedure. The RRC message of the RRC connection establishment procedure may be a RRC setup request message (or a RRCConnectionRequest message) or a RRC setup complete message (or a RRCConnectionSetupComplete message). The UE initiates the RRC connection establishment procedure to establish a RRC connection with a 5G RAN (e.g., gNB) of the 5G network. For example, in the RRC connection establishment procedure, the UE transmits the RRC setup request message to the gNB, and receives a RRC setup message (or a RRCConnectionSetup message) from the gNB in response to the RRC setup request message. The UE may or may not transmit the RRC setup complete message to the gNB in response to the RRC setup message. The UE may include the first slice information associated to the PDN connection in the RRC setup request message or in the RRC setup complete message.

In one example, the message is a RRC message of a RRC connection resume procedure. The RRC message of the RRC connection resume procedure is a RRC request message (e.g., a RRCConnectionResumeRequest message) or a RRC complete message (e.g., a RRCConnectionResumeComplete message). The UE initiates the RRC connection resume procedure to resume a RRC connection with the 5G RAN (e.g., gNB) of the 5G network. For example, in the RRC connection resume procedure, the UE transmits the RRC request message to the gNB, and receives a RRC resume message (e.g., a RRCConnectionResume message) from the gNB in response to the RRC request message. The UE may or may not transmit the RRC complete message to the gNB in response to the RRC resume message. The UE may include the first slice information associated to the PDN connection in the RRC request message or in the RRC complete message.

In one example, the first slice information is predetermined by the UE and the 5G network. In one example, the first S-NSSAI includes a value specified (or defined) by a 3GPP specification.

Figure 4:
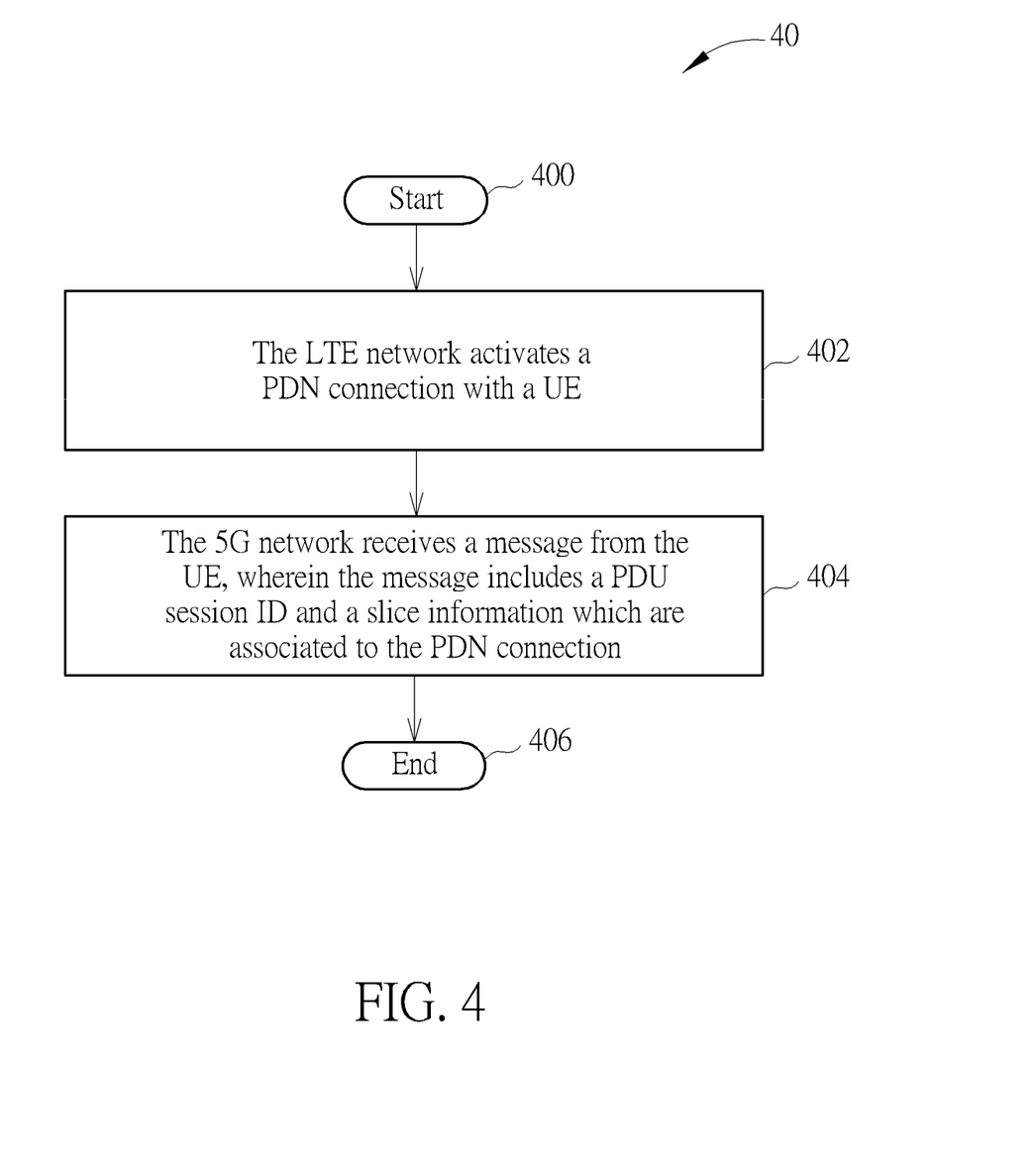
FIG. 4 is a flowchart of a process according to an example of the present invention.

A process 40 in FIG. 4 is utilized in a network including a 5G network and a LTE network, and includes the following steps:

Step 400: Start.

Step 402: The LTE network activates a PDN connection with a UE.

Step 404: The 5G network receives a message from the UE, wherein the message includes a PDU session ID and a slice information which are associated to the PDN connection.

Step 406: End.

In one example, the PDU session ID identifies a PDU session.

In one example, when the 5GCN of the 5G network receives the message, the 5GCN transmits a first interface message to the LTE network. When the LTE network receives the first interface message, the LTE network transmits a second interface message to the 5GCN. In one example, the second interface message includes an EPS bearer context of the PDN connection or configuration(s) of the PDN connection. In one example, the 5GCN determines the slice information. The 5GCN may associate the slice information to the PDU session derived or converted by the 5GCN according to the configuration(s) of the PDN connection or the EPS bearer context. The 5GCN may include the first slice information in a response message, and transmit the response message to the UE in response to the message.

The examples of the process 30 may be applied to the process 40, and are not narrated herein.

Figure 5:
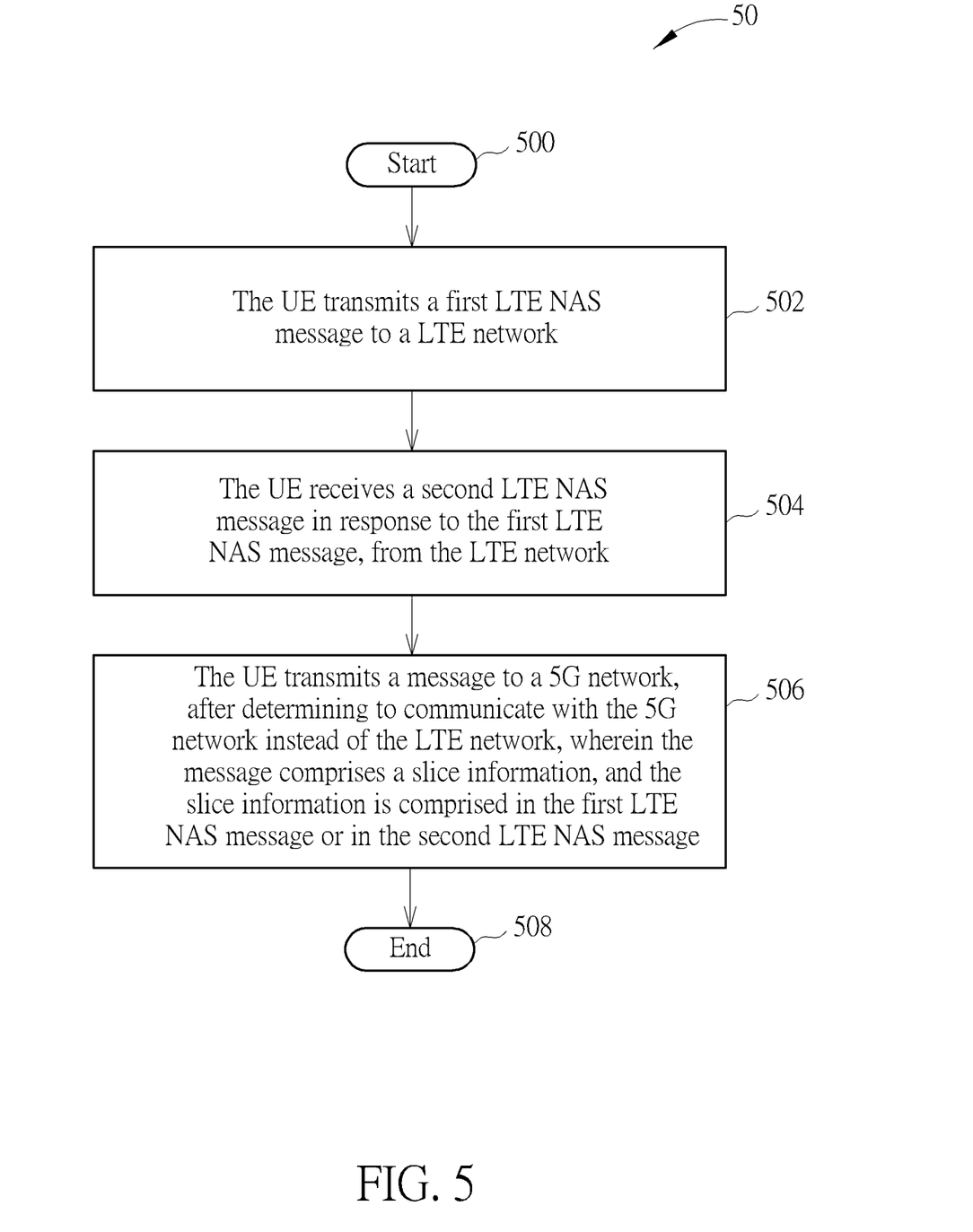
FIG. 5 is a flowchart of a process according to an example of the present invention.

A process 50 in FIG. 5 is utilized in a UE, and includes the following steps:

Step 500: Start.

Step 502: The UE transmits a first LTE Non-Access Stratum (NAS) message to a LTE network.

Step 504: The UE receives a second LTE NAS message in response to the first LTE NAS message, from the LTE network.

Step 506: The UE transmits a message to a 5G network, after determining to communicate with the 5G network instead of the LTE network, wherein the message comprises a slice information, and the slice information is comprised in the first LTE NAS message or in the second LTE NAS message.

Step 508: End.

Figure 6:
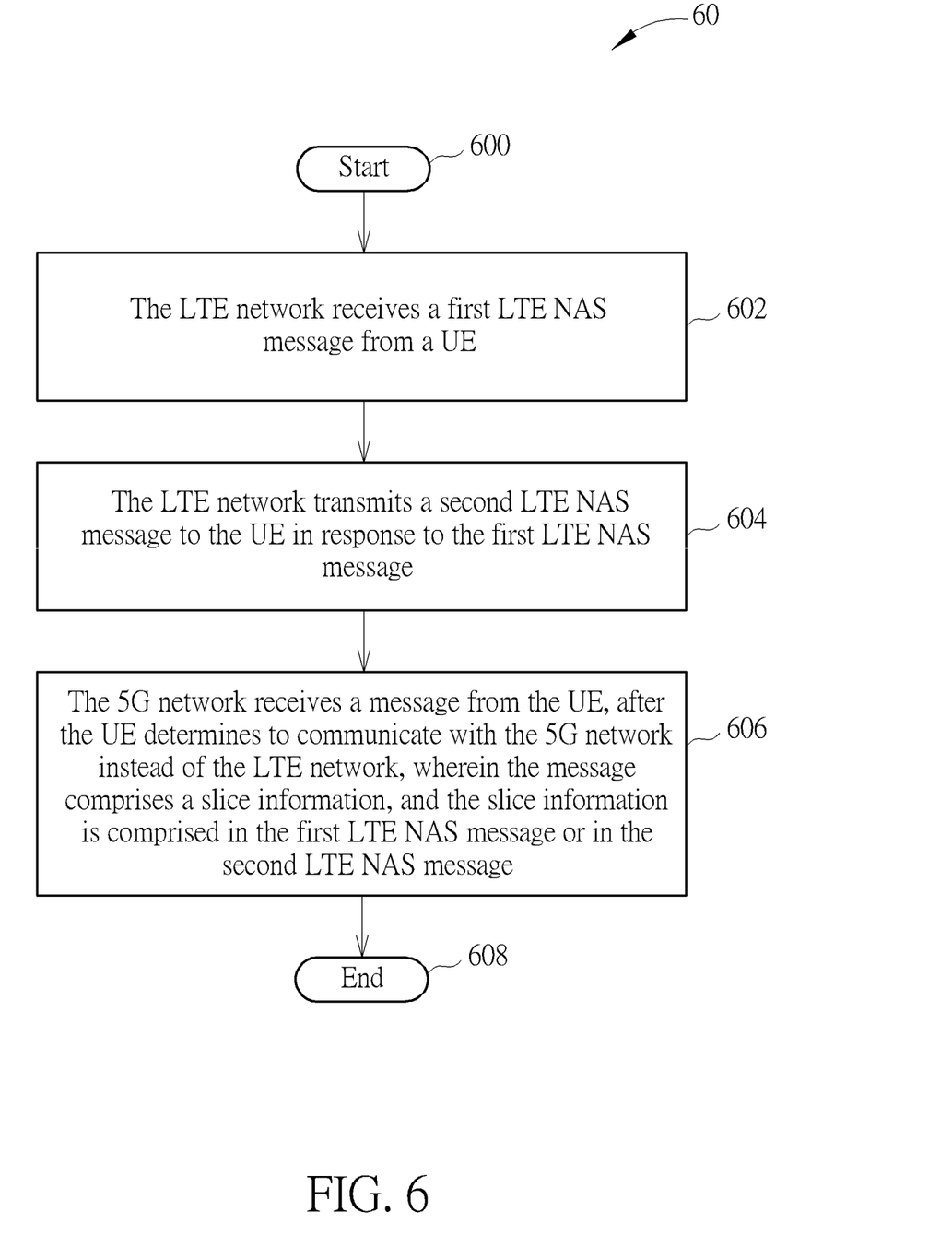
FIG. 6 is a flowchart of a process according to an example of the present invention.

A process 60 in FIG. 6 is utilized in a network including a 5G network and a LTE network, and includes the following steps:

Step 600: Start.

Step 602: The LTE network receives a first LTE NAS message from a UE.

Step 604: The LTE network transmits a second LTE NAS message to the UE in response to the first LTE NAS message.

Step 606: The 5G network receives a message from the UE, after the UE determines to communicate with the 5G network instead of the LTE network, wherein the message comprises a slice information, and the slice information is comprised in the first LTE NAS message or in the second LTE NAS message.

Step 608: End.

The following examples may be applied to the processes 50 and 60.

In one example, the UE includes the slice information in the message. In one example, the LTE network includes the slice information in the second LTE NAS message. In one example, the first LTE NAS message may or may not comprise the slice information. The UE may determine to comprise the slice information in the first LTE NAS message.

In one example, the first LTE NAS message is an Attach Request message or a Tracking Area Update (TAU) Request message, and the second LTE NAS message is an Attach Accept message or a TAU Accept message. The UE may transmit an Attach Complete message or a TAU Complete message to the LTE network in response to the Attach Accept message or the TAU Accept message.

In one example, the first LTE NAS message is a PDN Connectivity Request message, and the second LTE NAS message is an Activate Default EPS Bearer Context Request message.

In one example, the first NAS message does not include the slice information. The LTE network assigns the slice information in the second LTE NAS message to the UE. Thus, the UE can use the slice information in the message transmitted to the 5G network. In one example, the slice information is associated to the PDN connection.

The examples of the processes 30-40 may be applied to the processes 50-60, and are not narrated herein.

Figure 7:
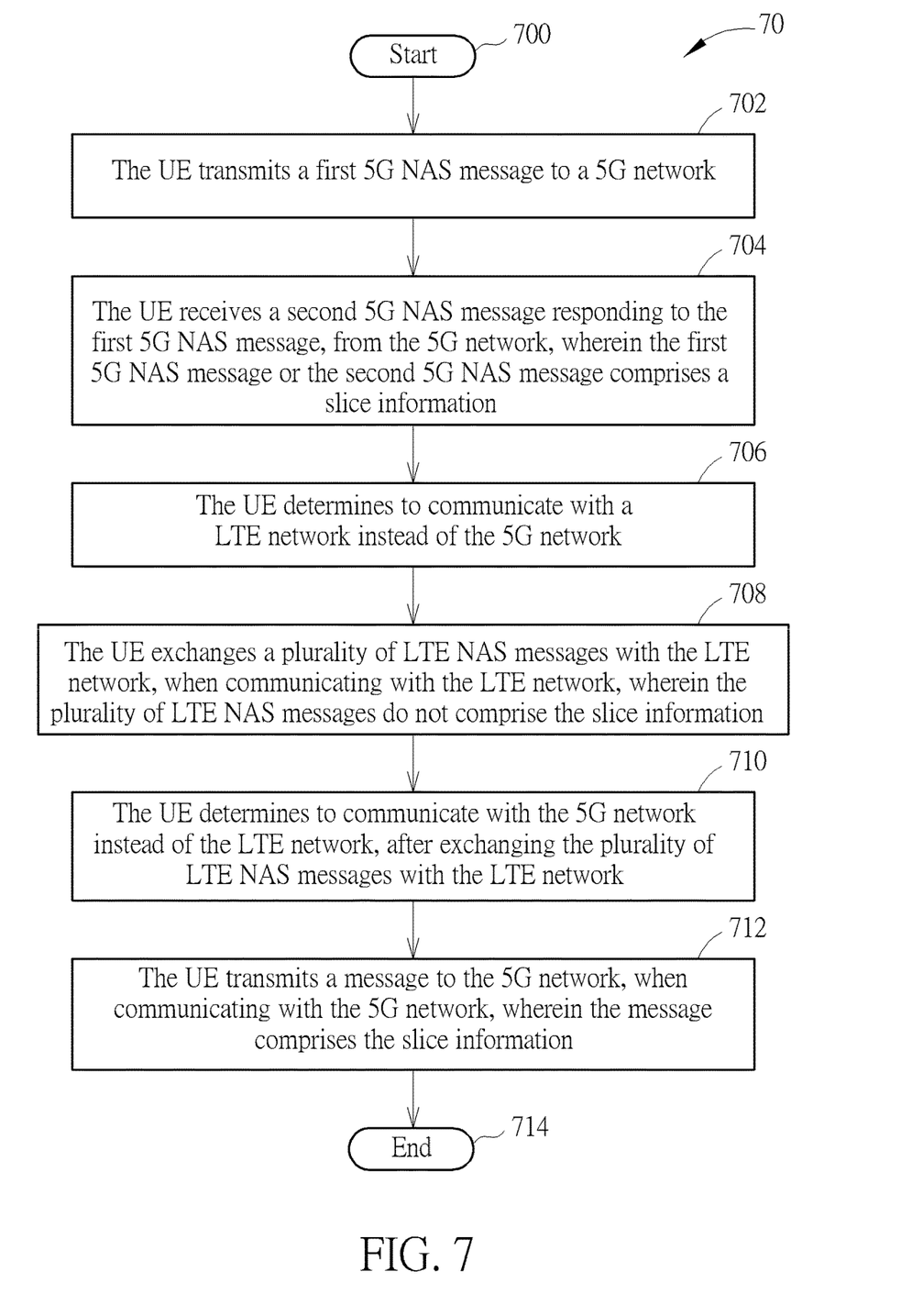
FIG. 7 is a flowchart of a process according to an example of the present invention.

A process 70 in FIG. 7 is utilized in a UE, and includes the following steps:

Step 700: Start.

Step 702: The UE transmits a first 5G NAS message to a 5G network.

Step 704: The UE receives a second 5G NAS message responding to the first 5G NAS message, from the 5G network, wherein the first 5G NAS message or the second 5G NAS message comprises a slice information.

Step 706: The UE determines to communicate with a LTE network instead of the 5G network.

Step 708: The UE exchanges a plurality of LTE NAS messages with the LTE network, when communicating with the LTE network, wherein the plurality of LTE NAS messages do not comprise the slice information.

Step 710: The UE determines to communicate with the 5G network instead of the LTE network, after exchanging the plurality of LTE NAS messages with the LTE network.

Step 712: The UE transmits a message to the 5G network, when communicating with the 5G network, wherein the message comprises the slice information.

Step 714: End.

According to the process 70, the first slice information is communicated (e.g., exchanged) between the UE and the 5G network, but is not communicated between the UE and the LTE network. In one example, the UE may or may not receive a response message responding to the message, from the 5G network.

In one example, the first 5G NAS message is a PDU Session Establishment Request message requesting for an establishment of a PDU session, and the second 5G NAS message is a PDU Session Establishment Accept message. The UE establishes the PDU session in the 5G network, when receiving the PDU Session Establishment Accept message. Thus, the slice information may be associated to the PDU session.

The examples of the processes 30-60 may be applied to the process 70, and are not narrated herein. For example, the first 5G NAS message or the message is the Registration Request message, the Service Request message or the PDU Session Establishment Request message. For example, the second 5G NAS message or the response message is the Registration Accept message, the Service Accept message or the PDU Session Establishment Accept message. In one example, the message is a RRC message of a RRC connection establishment procedure or a RRC message of a RRC connection resume procedure. In one example, the response message is a RRC message of a RRC reconfiguration procedure (e.g., RRC Reconfiguration message). In one example, the response message is a RRC message of a RRC security activation procedure (e.g., Security Mode Command message).

In one example, the first 5G NAS message (or the message) is a Deregistration Request message, and the second 5G NAS message (or the response message) is a Deregistration Accept message.

In one example, the UE determines to communicate with the LTE network instead of the 5G network in response to a cell selection or reselection performed by the UE or a command message received from the 5G network. In one example, the UE determines to communicate with the 5G network instead of the LTE network in response to a cell selection or reselection performed by the UE or a command message received from the LTE network. For example, the command message is a handover command message (e.g., a 5G RRCConnectionReconfiguration message) or a redirection command (e.g., a LTE RRC connection release message).

Realization of the processes 30-60 is not limited to the above description. The following examples may be applied to the processes 30-50 or may be combined to form a new invention.

In one example, when the UE connects to the 5G network, the 5G RAN of the 5G network transmits a RRC message (e.g., RRCConnectionReconfiguration) which configures the PDU session ID (e.g., the first PDU session ID) and a radio bearer (RB) configuration, to the UE. The RB configuration configures a RB associated to the PDU Session identified by the PDU Session ID. The UE communicates (e.g., transmits/receives) data of (or associated to) the PDU session with (e.g., to/from) the 5G network on the RB.

In one example, the UE discards (e.g., release or stop using) a configuration (or a parameter) received from the LTE network, when determining to communicate with the 5G network instead of the LTE network. For example, the configuration is an EPS network feature support, an Emergency number list, an Equivalent Public Land Mobile Network (PLMN) list, or a timer value.

In one example, the "5G" above may be replaced by the "6G". The description for the 5G network may be applied to the 6G network. In one example, the "LTE" and the "EPS" may be replaced by the "5G" and the "5G system", respectively, while the "5G" is replaced by the "6G". The description for the LTE network may be applied to the 5G network.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling the slice information for a UE between a LTE network and a 5G network. Thus, the seamless service continuity for the UE moving between the LTE network and the 5G network is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling mobility from a long-term evolution (LTE) network to a fifth generation (5G) network, comprising:
   a storage device; and
   a processing circuit, coupled to the storage device, wherein the storage device stores, and the processing circuit is configured to execute instructions of:
   transmitting a first LTE Non-Access Stratum (NAS) message to the LTE network;
   receiving a second LTE NAS message in response to the first LTE NAS message, from the LTE network, wherein the second LTE NAS message includes slice information;
   activating a Packet Data Network (PDN) connection with the LTE network;
   transmitting a Registration Request message to the 5G network, after determining to communicate with the 5G network instead of the LTE network, wherein the Registration Request message comprises both the same slice information received from the LTE network and Protocol Data Unit (PDU) session status indicating a PDU session mapped to a first PDU session ID as determined by the communication device according to the PDN connection; and
   receiving a Registration Accept message from the 5G network in response to the Registration Request message;
   wherein the first LTE NAS message is a PDN Connectivity Request message, and the second LTE NAS message is an Activate Default Evolved Packet System (EPS) Bearer Context Request message;
   wherein the Registration Accept message includes the PDU session status corresponding to the first PDU session ID.

2. The communication device of claim 1, wherein the slice information identifies at least one network slice.

3. The communication device of claim 1, wherein the slice information comprises a Network Slice Selection Assistance information (NSSAI) or a Single NSSAI (S-NSSAI).

4. The communication device of claim 1, wherein the Registration Request message includes at least one of a Registration type, a Subscriber Permanent Identifier (SUPI) or a temporary identifier, security parameters, a UE 5G core network (5GCN) Capability.

5. A method of handling mobility for a communication device from a long-term evolution (LTE) network to a fifth generation (5G) network, comprising:
   receiving, by the LTE network, a first LTE Non-Access Stratum (NAS) message from the communication device;
   transmitting, by the LTE network, a second LTE NAS message to the communication device in response to the first LTE NAS message, wherein the second LTE NAS message includes slice information;
   activating, by the 5G network, a Packet Data Network (PDN) connection with the LTE network;
   receiving, by the 5G network, a Registration Request message from the communication device, wherein the Registration Request message comprises both the same slice information received by the communication device from the LTE network and Protocol Data Unit (PDU) session status indicating a PDU session mapped to a first PDU session ID as determined by the communication device according to the PDN connection; and
   transmitting, by the 5G network, a Registration Accept message to the communication device in response to the Registration Request message;
   wherein the first LTE NAS message is a PDN Connectivity Request message, and the second LTE NAS message is an Activate Default Evolved Packet System (EPS) Bearer Context Request message;
   wherein the Registration Accept message includes the PDU session status corresponding to the first PDU session ID.

6. The method of claim 5, wherein the slice information identifies at least one network slice.

7. The method of claim 5, wherein the slice information comprises a Network Slice Selection Assistance information (NSSAI) or a Single NSSAI (S-NSSAI).

8. The method of claim 5, wherein the Registration Request message includes at least one of a Registration type, a Subscriber Permanent Identifier (SUPI) or a temporary identifier, security parameters, a user equipment (UE) 5G core network (5GCN) Capability.

9. A user equipment (UE) for handling mobility between a long-term evolution (LTE) network and a fifth generation (5G) network, comprising:
   a storage device; and
   a processing circuit, coupled to the storage device, wherein the storage device stores, and the processing circuit is configured to execute instructions of:
   transmitting a first 5G Non-Access Stratum (NAS) message to the 5G network;
   receiving a second 5G NAS message responding to the first 5G NAS message, from the 5G network, wherein the first 5G NAS message or the second 5G NAS message comprises slice information;
   determining to communicate with the LTE network instead of the 5G network;
   exchanging a plurality of LTE NAS messages with the LTE network, when communicating with the LTE network, wherein the plurality of LTE NAS messages do not comprise the slice information;
   activating a Packet Data Network (PDN) connection with the LTE network;
   determining to communicate with the 5G network instead of the LTE network, after exchanging the plurality of LTE NAS messages with the LTE network;
   transmitting a Registration Request message to the 5G network, when communicating with the 5G network, wherein the Registration Request message comprises both the slice information and Protocol Data Unit (PDU) session status indicating a PDU session mapped to a first PDU session ID as determined by the UE according to the PDN connection; and
   receiving a Registration Accept message from the 5G network in response to the Registration Request message;

wherein the first 5G NAS message is a PDU Session Establishment Request message or a Registration Request message, and the second 5G NAS message is a PDU Session Establishment Accept message or a Registration Accept message;

wherein the Registration Accept message includes the PDU session status corresponding to the first PDU session ID.

10. The UE of claim 9, wherein the Registration Request message includes at least one of a Registration type, a Subscriber Permanent Identifier (SUPI) or a temporary identifier, security parameters, a UE 5G core network (5GCN) Capability.

* * * * *